United States Patent
Perkins et al.

(10) Patent No.: US 10,733,328 B1
(45) Date of Patent: Aug. 4, 2020

(54) HARDWARE TRANSPORTATION TROLLEY

(71) Applicant: Amazon Technologies, Inc., Seattle, WA (US)

(72) Inventors: Matthew Perkins, Shoreline, WA (US); Somasundaram Niranjayan, Issaquah, WA (US); Nihar Desai, Seattle, WA (US); Mike MacGregor, Seattle, WA (US); Benjamin Philipp Grefe, Auburn, WA (US); Ahmed Mohammed Shihab, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 15/795,106

(22) Filed: Oct. 26, 2017

(51) Int. Cl.
*G06F 21/88* (2013.01)
*G06F 21/78* (2013.01)
*G06F 1/18* (2006.01)
*B62B 3/00* (2006.01)

(52) U.S. Cl.
CPC .............. *G06F 21/78* (2013.01); *B62B 3/005* (2013.01); *G06F 1/187* (2013.01); *G06F 21/88* (2013.01); *G06F 2221/2111* (2013.01)

(58) Field of Classification Search
CPC .......... G06F 21/78; G06F 1/187; G06F 21/88; G06F 2221/2111; B62B 3/005
See application file for complete search history.

(56) References Cited

U.S. PATENT DOCUMENTS

| 8,016,194 | B2 * | 9/2011 | Hause | G06K 7/0004 235/384 |
| 10,412,853 | B2 * | 9/2019 | Dombrowski | B62B 3/005 |
| 2008/0061979 | A1 * | 3/2008 | Hause | G06Q 10/08 340/572.1 |
| 2008/0091701 | A1 * | 4/2008 | Gujarathi | G06Q 10/087 |
| 2009/0096336 | A1 * | 4/2009 | Petrick | G06F 13/4022 312/237 |
| 2012/0005344 | A1 * | 1/2012 | Kolin | H05K 7/20836 709/226 |
| 2014/0088979 | A1 * | 3/2014 | Garman | G06Q 10/0631 705/1.1 |
| 2017/0161703 | A1 * | 6/2017 | Dodia | G06K 7/1413 |

OTHER PUBLICATIONS

U.S. Appl. No. 13/625,507, filed Sep. 24, 2012, Martthew S. Garman et al.
U.S. Appl. No. 15/719,119, filed Sep. 28, 2017, Matthew Perkins et al.
U.S. Appl. No. 15/719,159, filed Sep. 28, 2017, Matthew Perkins et al.

* cited by examiner

*Primary Examiner* — Baotran N To
(74) *Attorney, Agent, or Firm* — Robert C. Kowert; Kowert, Hood, Munyon, Rankin & Goetzel, P.C.

(57) ABSTRACT

A facility monitoring system and/or a secure data storage device transport trolley accounts for data storage devices removed from rack computing devices while in transport. The secure data storage device transport trolley comprises a backplane, backplane connectors, and a computing device coupled to the backplane. The computing device scans for data storage devices connected to the connectors of the backplane at regular intervals and maintains an updated list of data storage devices being transported by the secure data storage device transport trolley. The secure data storage device transport trolley also provides the list to a facility monitoring system for reconciliation.

20 Claims, 10 Drawing Sheets

HARDWARE TRANSPORTATION TROLLEY

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of data centers has increased, the tasks of provisioning, administering, and managing the physical computing resources have become increasingly complicated.

For example, increasing amounts of potentially sensitive information are stored on storage devices housed in data centers or other locations. In many instances, customers of a data storage service, such as a data center, rely on the data storage service to protect the customer's data from unauthorized access. Additionally, a risk data storage services face is a malefactor, such as a rogue employee or intruder, physically removing or accessing storage devices storing a customer's data. In order to reduce such a risk, some data storage services may have systems and policies in place to prevent unauthorized access to data storage devices mounted in rack computing systems. However, these systems and policies may leave data storage devices vulnerable to unauthorized access when the data storage devices are being transported within a facility, such as a data center.

Figure 1A:
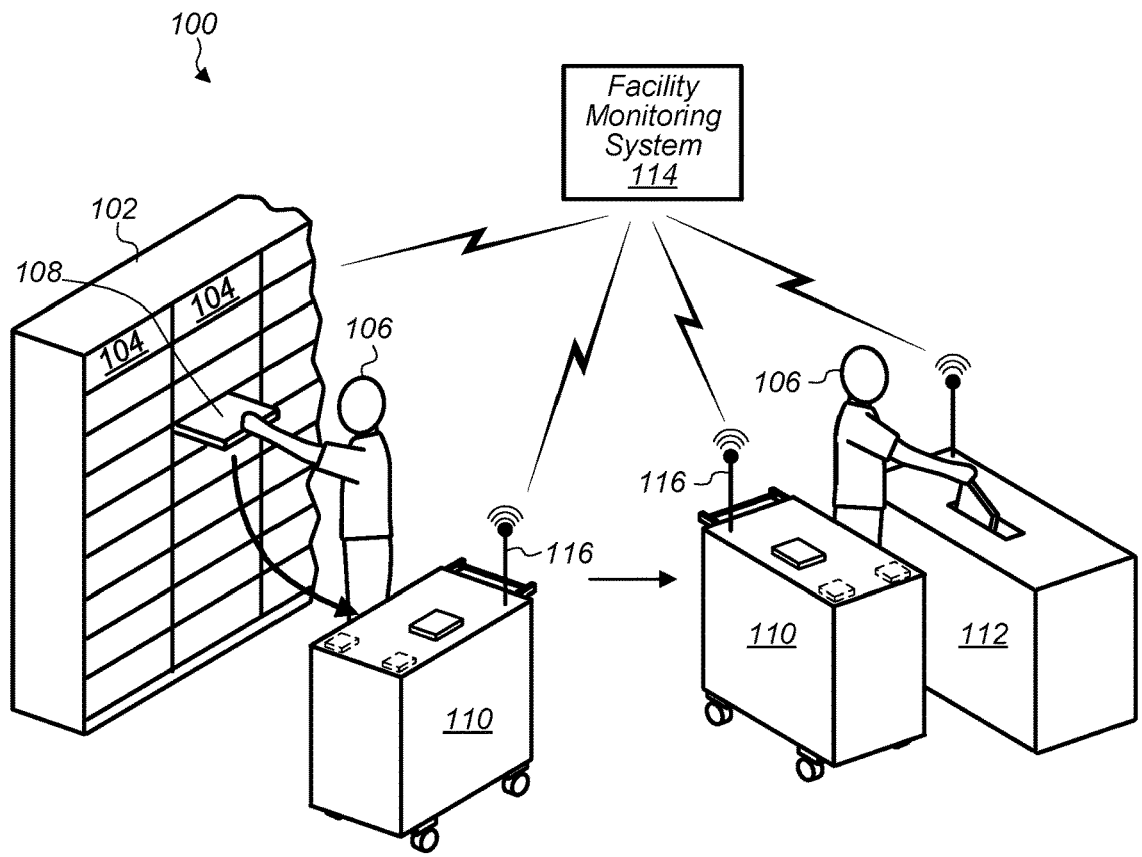
FIG. 1A illustrates a secure data storage device transport trolley transporting data storage devices from a rack to a disposal unit, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for securely transporting data storage devices are disclosed.

According to one embodiment, a data center includes one or more racks comprising storage devices, such as hard disk drives, solid state drives, memory devices, etc. The data center also includes a secure storage device transporter, such as a trolley, cart, robot, drone, etc. The secure storage device transporter includes a locomotive element configured to facilitate movement of the secure storage device transporter within the data center. Additionally, the secure storage device transporter includes a host bus adapter, a host computing device coupled to the host bus adapter, and a plurality of connectors, wherein respective ones of the connectors are configured to couple with respective storage devices removed from the one or more racks such that the respective storage devices are coupled to the host bus adapter via the respective ones of the connectors. Note that in some embodiments, a secure storage device transporter may include various structural arrangements that support a locomotive element configured to facilitate movement of the secure storage device transporter within the data center. The host computing device is configured to identify respective serial numbers of the respective storage devices coupled to the host bus adapter and maintain a list comprising one or more serial numbers for each of one or more storage devices coupled to the host bus adapter. In some embodiments, the host computing device may provide updated lists of which storage devices are currently stowed in the secure storage device transporter to a monitoring system, such as a facility monitoring system of a data center.

According to one embodiment, an apparatus, such as a secure data storage device transport trolley, includes a mobile structure for transporting data storage devices within a facility, a backplane coupled to the mobile structure, a computing device connected to the backplane, and a plurality of connectors coupled to the backplane. Respective ones of the connectors are configured to couple with respective data storage devices being transported in the mobile structure. Additionally, the computing device is configured to identify an identifier of a data storage device coupled to the backplane, such as a serial number of the data storage device or other identifier, and add the identifier to a list comprising one or more identifiers for one or more data storage devices coupled to the host bus adapter.

According to one embodiment, a method includes maintaining, by a computing device of a secure storage device transporter, a list comprising one or more identifiers for one or more storage devices coupled to a backplane of the secure storage device transporter via one or more connectors of the secure storage device transporter. The method further includes scanning at a pre-determined time interval, a plurality of connectors of the secure storage device transporter to identify identifiers of storage devices currently coupled to the backplane of the secure storage device transporter via one or more connectors of the secure storage device transporter. The method also includes updating the list to include identifiers of storage devices that have been coupled to the backplane and to not include identifiers for storage devices that have been decoupled from the backplane.

As used herein, a "locking mechanism" means a device, element, system, or combination thereof, that requires an action to allow access to one or more resources. Examples of locking mechanisms include electronic locking devices, magnetic locks, solenoid locking mechanisms, etc.

As used herein, "computing" includes any operations that can be performed by a computer, such as computation, data storage, data retrieval, or communications.

As used herein, "computing device" includes any of various devices in which computing operations can be carried out, such as computer systems or components thereof. As used herein, the term computing device is not limited to just those integrated circuits referred to in the art as a computer, but broadly refers to, a server, a microcontroller, a microcomputer, a programmable logic controller (PLC), an application specific integrated circuit, and other programmable circuits, and these terms are used interchangeably herein. In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner.

As used herein, "data center" includes any facility or portion of a facility in which computer operations are carried out. A data center may include servers dedicated to specific functions or serving multiple functions. Examples of computer operations include information storage, information processing, communications, testing, simulations, power distribution and control, and operational control.

As used herein, a "rack" means a rack, container, frame, or other element or combination of elements that can contain or physically support one or more computing devices or one or more data storage devices.

Some data centers may employ systems and policies to ensure customer data stored in data storage devices mounted in racks in a data center is maintained secure. However, such systems and/or policies may be suspended for, not applied to, or not encompass data storage devices that have been removed from the racks or data storage devices that have not yet been installed in a rack. Thus, in such data centers, a malefactor, such as a rogue employee or intruder, may be able to gain unauthorized access to data storage devices while in transport, without existing system and policies preventing such unauthorized access. For example, a data storage device may be removed from a rack for a variety of reasons, such as a malfunctioning device, a hardware upgrade, a facility reconfiguration, etc. In such situations, while the data storage device is removed from the rack, systems in a rack such as a rack lock, secure rack area, rack monitoring systems, etc. may be insufficient to prevent unauthorized access to the data storage device. For example, a data storage device hand carried, or placed on a simple cart may be vulnerable to unauthorized access. Also, such unauthorized accesses may not be quickly identified. For example, a missing data storage device may not be detected as missing until an audit is performed, a task involving the data storage device, such as a repair task, is to be performed, etc.

In some embodiments, in order to secure data storage devices in transport, a secure data storage device transport trolley may be used. A secure data storage device transport trolley may include a mobile structure, a locomotive element, such as a wheel or other locomotive device, a backplane, and a computing device connected to the backplane. The backplane may include a plurality of connectors configured to couple with data storage devices being transported in the secure data storage device transport trolley. The backplane may function as or be a host bus adapter and may be configured to support various communication protocols such as small computer system interface (SCSI), Fibre Channel, Serial ATA (SATA), Parallel ATA (PATA), Ethernet, FireWire, USB, Integrated Device Electronics (IDE), and other suitable protocols. Additionally, the computing device connected to the backplane may be configured to scan from time to time (e.g. every 2-5 seconds as an example) all connectors of the backplane to identify data storage devices currently stowed in the secure data storage device transport trolley. The computing device of the secure data storage device transport trolley may maintain a current list of data storage devices, identified by serial number, for all data storage devices currently stowed in the secure data storage device transport trolley. The current list of data storage devices stowed in the secure data storage device transport trolley may be provided to a monitoring system, such as a facility monitoring system of a data center. The facility monitoring system may additionally receive serial numbers for data storage devices mounted in racks of the facility and may receive serial numbers for data storage devices that have been cleared of customer data, for example by a disposal unit. Thus, a monitoring system, such as a facility monitoring system of a data center, may account for data storage devices mounted in racks of the data center, data storage devices in transport within the data center, and data storage devices that have been purged of customer data via a disposal unit. Thus, risks of unauthorized access may be significantly reduced because data storage devices are accounted for in transportation and up to the point of disposal.

Furthermore, in some embodiments, a monitoring system, such as a facility monitoring system of a data center may account for data storage devices that have been received at a facility but not yet installed in a rack. For example, data storage devices, when received may be loaded into secure data storage device transport trolleys and accounted for while awaiting installation in a rack. The data storage devices may also be accounted for while being transported to a rack where the data storage devices are to be installed.

FIG. 1A illustrates a secure data storage device transport trolley transporting data storage devices from a rack to a disposal unit, according to some embodiments.

Data center 100 includes racks 102 of computing devices 104. At least some of the computing devices 104 include data storage devices, such as hard disk drives, solid state drives, memory modules, etc. For example, technician 106 is removing data storage device 108 from racks 102.

Data center 100 also includes secure data storage device transport trolley 110 and disposal unit 112. In FIG. 1A technician 106 is removing data storage device 108 from rack 102 and transporting the data storage device 108 to disposal unit 112 using secure data storage device transport trolley 110.

In some embodiments, a facility, such as data center 100, may include a monitoring system, such as facility monitoring system 114. A monitoring system, such as facility monitoring system 114, may receive indications of data storage devices mounted in racks, such as racks 102, indications of data storage devices being transported in a secure data storage device transport trolley, such as secure data storage device transport trolley 110, and indications of data storage devices that have been deposited in a disposal unit, such as disposal unit 112. Thus, a monitoring system may track and/or account for data storage devices while they are mounted in a rack and while the data storage devices are being transported, for example to a disposal unit or other destination. In this way, vulnerable time periods when data storage devices are not accounted for, such as during transport, are significantly reduced in comparison to previous systems. In some embodiments, a secure data storage device transport trolley may include one or more batteries, a backplane, also referred to herein as a host bus adapter, comprising connectors configured to couple with data storage devices being transported. The secure data storage device transport trolley may also include a computing device configured to scan for data storage devices connected to the backplane/host bus adapter and may include a Wi-Fi card or other wireless communication element configured to supply an updated list of data storage devices being transported to a monitoring system. For example, secure data storage device trolley 110 includes wireless communication element 116 configured to wirelessly communicate with facility monitoring system 114. In some embodiments, wireless communications between a secure data storage device trolley, such as secure data storage device trolley 110, and an external system, such as facility monitoring system 114, may be encrypted. Additionally, in some embodiments, a rack such as rack 102 may wirelessly or via a wired connection communicate with a monitoring system, such as facility monitoring system 114, to indicate data storage devices mounted in the rack. In a similar manner, a disposal unit, such as disposal unit 112, may wirelessly or via a wired connection communicate with a monitoring system, such as facility monitoring system 114, to indicate data storage devices received by the disposal unit. In some embodiments, a disposal unit may remove customer data from data storage devices received by the disposal unit. In some embodiments, a disposal unit may destroy data storage devices such that customer data cannot be read from the data storage devices.

In some embodiments, a disposal unit may alter data storage devices in other ways such that customer data stored on the data storage devices cannot be retrieved.

Figure 1B:
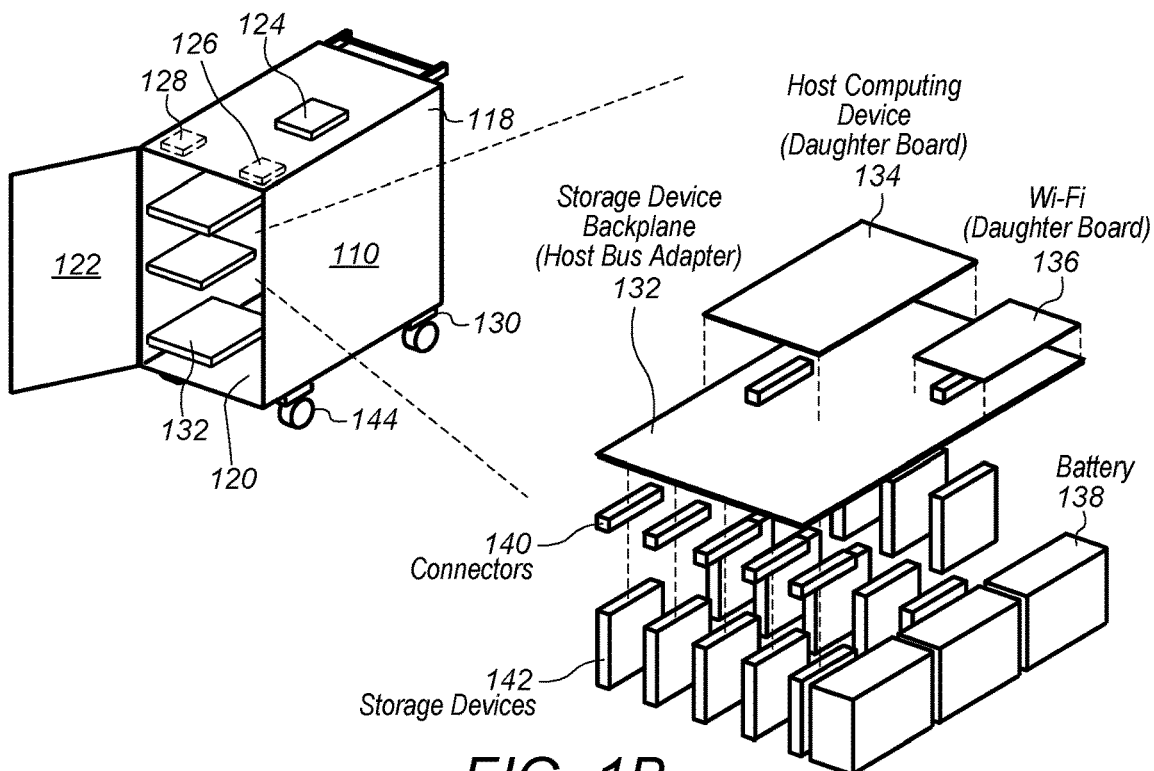
FIG. 1B illustrates a more detailed view of a secure data storage device transport trolley, according to some embodiments.

FIG. 1B illustrates a more detailed view of a secure data storage device transport trolley, according to some embodiments.

A secure data storage device transport trolley, such as secure data storage device transport trolley 110, may include an outer structure, such as structure 118, and may include an interior space, such as interior space 120, within the outer structure. In some embodiments, a door such as door 122, may prevent access to the interior space when closed and may allow access to the interior space when open. The interior space may be enclosed by the outer structure and the door when the door is closed such that a data storage devices mounted within the interior space are not accessible when the door is closed.

In addition, in some embodiments, a secure data storage device transport trolley may include an access interface, such as access interface 124. In some embodiments, an access interface may include a scanner device and an identity verification device. For example, a scanner device may be a bar code scanner or other type of scanner configured to read a serial number of a data storage device. Also, as another example, an identity verification device may be a proximity card reader, a biometric scanner, such as a finger print scanner, a barcode reader configured to read a barcode printed on a technician identification card, etc. Also, in some embodiments, an identity scanner and/or a scanner device may include a key pad wherein a technician enters a serial number of a data storage device or a technician identity number via the keypad.

In some embodiments, a secure data storage device transport trolley may include one or more tamper sensors to ensure that the secure data storage device transport trolley is not breached or stolen. For example, secure data storage device transport trolley 110 includes door sensor 126 configured to detect tampering with door 122. Also, secure data storage device transport trolley 110 includes tilt sensor 128 configured to detect whether or not secure data storage device transport trolley is tilted more than a threshold amount. Also, secure data storage device transport trolley includes lift sensors 130. In some embodiments, lift sensors, such as lift sensors 130 may be compressed by a weight of a secure data storage device transport trolley and may trigger an alarm if decompressed by the weight of the secure data storage device transport trolley being reduced, such as during lifting.

In some embodiments, a secure data storage device transport trolley may include various types of locomotive elements such as wheels, a track, a hover platform, helicopter type mechanism etc. For example, secure data storage device transport trolley 110 includes wheels 144. In some embodiments, a locomotive element may be passive. For example, wheels 144 may enable easy movement of secure data storage device transport trolley 110, but may require a technician to push the trolley. In other embodiments, locomotive elements may be active and actively drive a secure data storage device transport trolley. For example, in some embodiments, wheels 144 may be self-propelled and a navigation system of secure data storage device transport trolley 110 may cause wheels 144 to propel secure data storage device transport trolley 110 through a facility without a technician pushing the trolley.

FIG. 1B also illustrates internal components of a secure data storage device transport trolley, such as backplane 132 (also referred to herein as a host bus adapter), host computing device 134 mounted on backplane 132 and Wi-Fi board 136 mounted on backplane 132. In some embodiments, Wi-Fi board 136 may include a wireless communication element 116. Additionally, in some embodiments, a secure data storage device transport trolley, may include batteries, such as batteries 138, that provide power to the host computing device and backplane while the secure data storage device transport trolley is being transported within a facility. Also, the backplane may distribute power to data storage devices coupled to the backplane.

Additionally, backplane 132 includes connectors 140 configured to couple with data storage devices that are being transported such as data storage devices 142. The connectors couple the data storage devices to the backplane/host bus adapter such that the data storage devices are recognizable by a host computing device, such as host computing device 134. In some embodiments, connectors, such as connectors 140, may include ribbon cable connectors or other types of flexible connectors that accommodate data storage devices of different sizes or different form factors. Also, in some embodiments, connectors, such as connectors 140, may include connectors of different types configured to couple with different types of connectors of data storage devices. Additionally, in some embodiments, connectors, such as connectors 140, may be interchangeable, such that connectors can be exchanged to match a connector type of a data storage device being transported in a secure data storage device transport trolley.

In some embodiments, multiple backplanes may be included in a secure data storage device transport trolley. For example, secure data storage device transport trolley 110 includes multiple backplanes 132. In some embodiments, backplanes, such as backplanes 132, may be mounted within a secure data storage device transport trolley in various orientations and arrangements. For example, secure data storage device transport trolley 110 includes backplanes 132 organized as horizontal shelves. In some embodiments, backplanes, such as backplanes 132, may be vertically oriented, or may be oriented or organized in various other ways.

In some embodiments, a secure data storage device transport trolley, such as secure data storage device transport trolley 110, may further include a diagnostic testing station either external to the interior space or included in the interior space of the secure data storage device transport trolley. For example, in some embodiments, a technician may diagnostically test a data storage device before adding the data storage device to a secure data storage device transport trolley. Also, in some embodiments, a host computing device of a secure data storage device transport trolley may perform diagnostic testing of data storage devices coupled to a backplane of the secure data storage device transport trolley.

Figure 2:
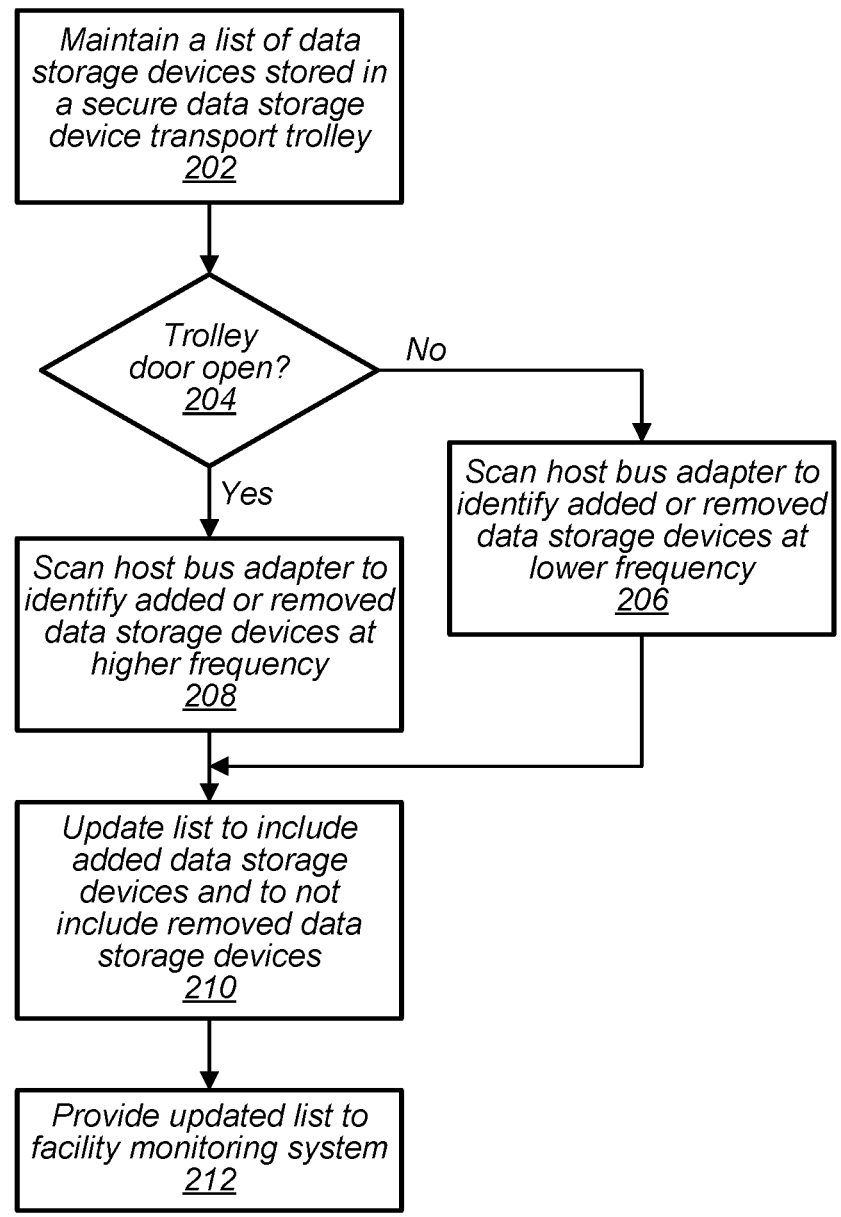
FIG. 2 is a flow diagram illustrating accounting for data storage devices being transported, according to some embodiments.

FIG. 2 is a flow diagram illustrating accounting for data storage devices being transported, according to some embodiments.

At 202, a secure data storage device transport trolley, maintains a list of data storage devices stored in the secure data storage device transport trolley. For example host computing device 134 maintains a list of data storage devices 142 connected to a backplane 132 via connectors 140.

At 204, the secure data storage device transport trolley determines if the trolley door is open. For example, a host computing device, such as host computing device 134 may receive a signal from a door sensor such as door sensor 126 indicating that door 122 is open or indicating that door 122 is closed. At 206, if the door is closed, the host computing device may scan a host bus adaptor or backplane for connected data storage devices at a lower frequency, for example once every minute or once every five minutes. At 208, if the door is open, the host computing device may scan the host bus adaptor or backplane for connected data storage devices at a higher frequency, for example once every few seconds or once every 30 seconds. In some embodiments, scan performed at the lower frequency and scans performed at the higher frequency may be more or less often.

At 210 the host computing device may update the list of serial numbers for data storage devices by adding serial numbers for any newly detected data storage devices to the list and removing serial numbers for any data storage devices no longer connected to the host bus adapter/backplane from the list. In some embodiments, a host computing device may replace a previous list with a new list including serial numbers for all data storage devices currently connected to the host bus adapter/backplane.

At 212, the host computing device, via a wireless interface, such as Wi-Fi board 136 and or wireless communication element 116, may provide the updated list to a monitoring system, such as facility monitoring system 114.

In some embodiments, a secure data storage device transport trolley may be configured to require certain credentials and/or conditions to be met before granting access to an internal space of the secure data storage device transport trolley. For example, in some embodiments, a secure data storage device transport trolley may require a technician to verify the technician's identity before granting access to an internal space of the secure data storage device transport trolley. For example, a technician may present an identity card, fingerprint, facial scan, or other type of identification to an identity verification device of a secure data storage device transport trolley.

Also, in some embodiments, a secure data storage device transport trolley may be configured to require verification that a pre-determined data storage device is being added to the secure data storage device transport trolley before granting access to an internal space of the secure data storage device transport trolley. For example, a secure data storage device transport trolley may require a bar code scan of a data storage device to be performed before adding the data storage device to the secure data storage device transport trolley. In some embodiments, the secure data storage device transport trolley may maintain a set of predetermined serial numbers for data storage devices that are to be added to the secure data storage device transport trolley and may compare a serial number being scanned for a data storage device that is to be added to the secure data storage device transport trolley against serial numbers of the set of predetermined serial numbers for data storage devices that are to be added to the secure data storage device transport trolley.

In some embodiments, a monitoring system or other facility system, such as a work order system, may generate tokens for tasks that involve adding data storage devices to a secure data storage device transport trolley. For example, a token may include a serial number for a data storage device that is to be added to a secure data storage device transport trolley as part of performing a task. Also, a token may include a time window when a task it to be performed. Additionally, a token may include an identity of a person assigned to perform a task. In some embodiments, an identity verification device, a scanner device, and a computing device of a secure data storage device transport trolley may collect and compare information collected at a task location to information included in a task token before granting access to an internal space of a secure data storage device transport trolley. For example, a location of a secure data storage device transport trolley relative to a task location may be verified, an identity of a person performing a task may be verified, a serial number of a data storage device may be verified, and it may be verified that a current time is within a time window for when the task is to be performed. In some embodiments, if one or more of these items do not pass verification, access to an internal space of a secure data storage device transport trolley may be denied.

Figure 3:
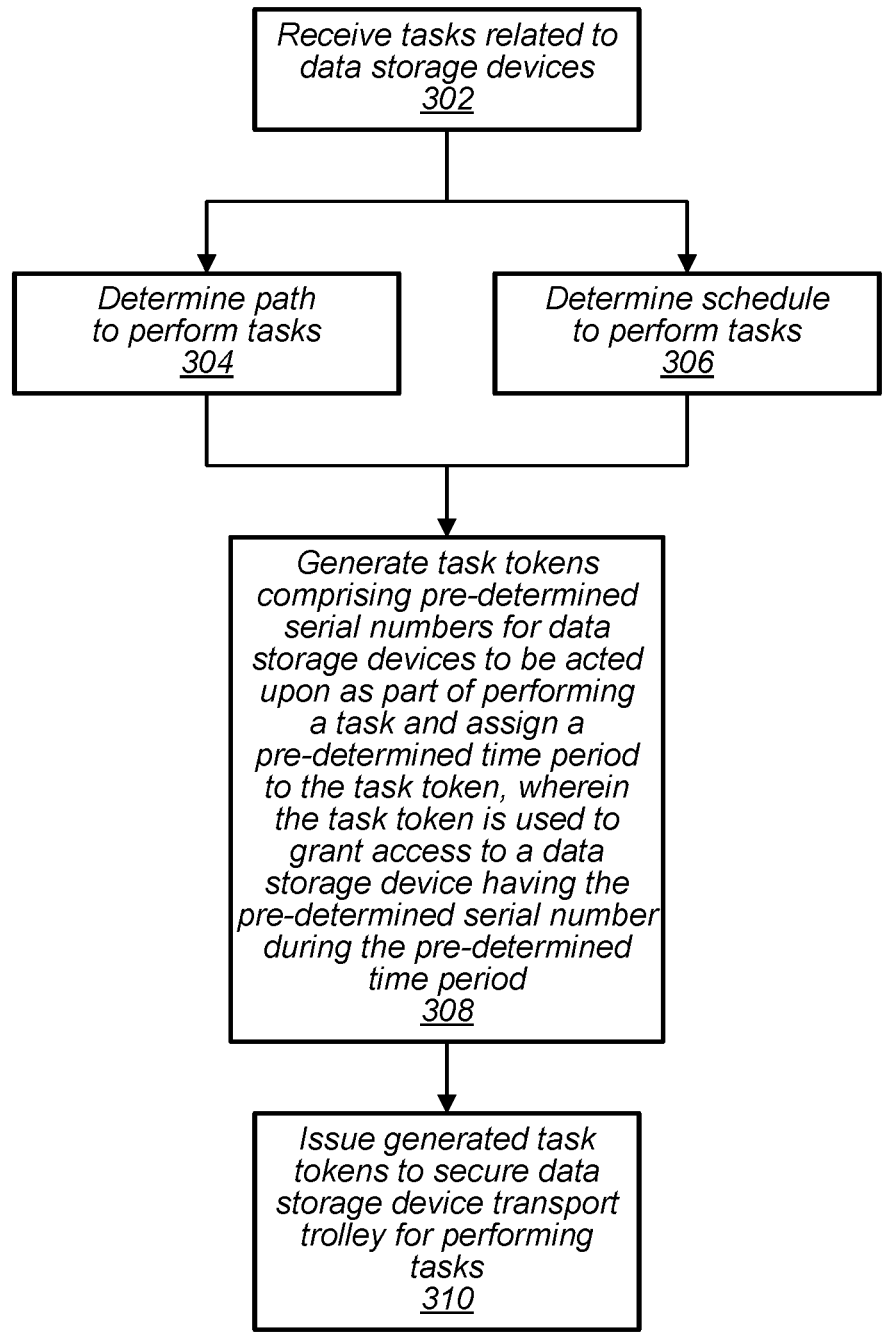
FIG. 3 is a flow diagram illustrating generating task tokens to be used by a secure data storage device transport trolley, according to some embodiments.

FIG. 3 is a flow diagram illustrating generating task tokens to be used by a secure data storage device transport trolley, according to some embodiments. At 302 tasks related to data storage devices are received. For example, a work order system may compile a list of scheduled tasks that involve removing or replacing data storage devices mounted in racks at a data center. At 304 a path for a secure data storage device transport trolley being used to perform the tasks may be determined. Also, at 306 a schedule for performing the task may be determined. In some embodiments the schedule and the path may be coordinated such that tasks are scheduled in an order that corresponds to the order in which the tasks will be encountered in the determined path.

At 308, task tokens are generated for the tasks taking into account the determined schedule and/or path. In some embodiments, each task token may correspond to an individual task or a task token may include information for performing multiple tasks. In some embodiments, a task token may include one or more serial numbers for data storage devices to be acted upon in performing the task. Also a task token may include an identity of a person that is to perform the task and a time window within which the task is to be performed. In some embodiments, a task token may include an indication of a location wherein the task is to be performed. For example, a task token may indicate that data storage device with serial number 123456 is to be removed from rack 1 in row 2 of computer room 3 on the second day of the week.

At 310, one or more generated task tokens are provided to a secure data storage device transport trolley for use in performing the tasks. In some embodiments, a secure data storage device transport trolley may verify one or more conditions match information included in a task token before granting access to an internal space of the secure data storage device transport trolley.

Figure 4:
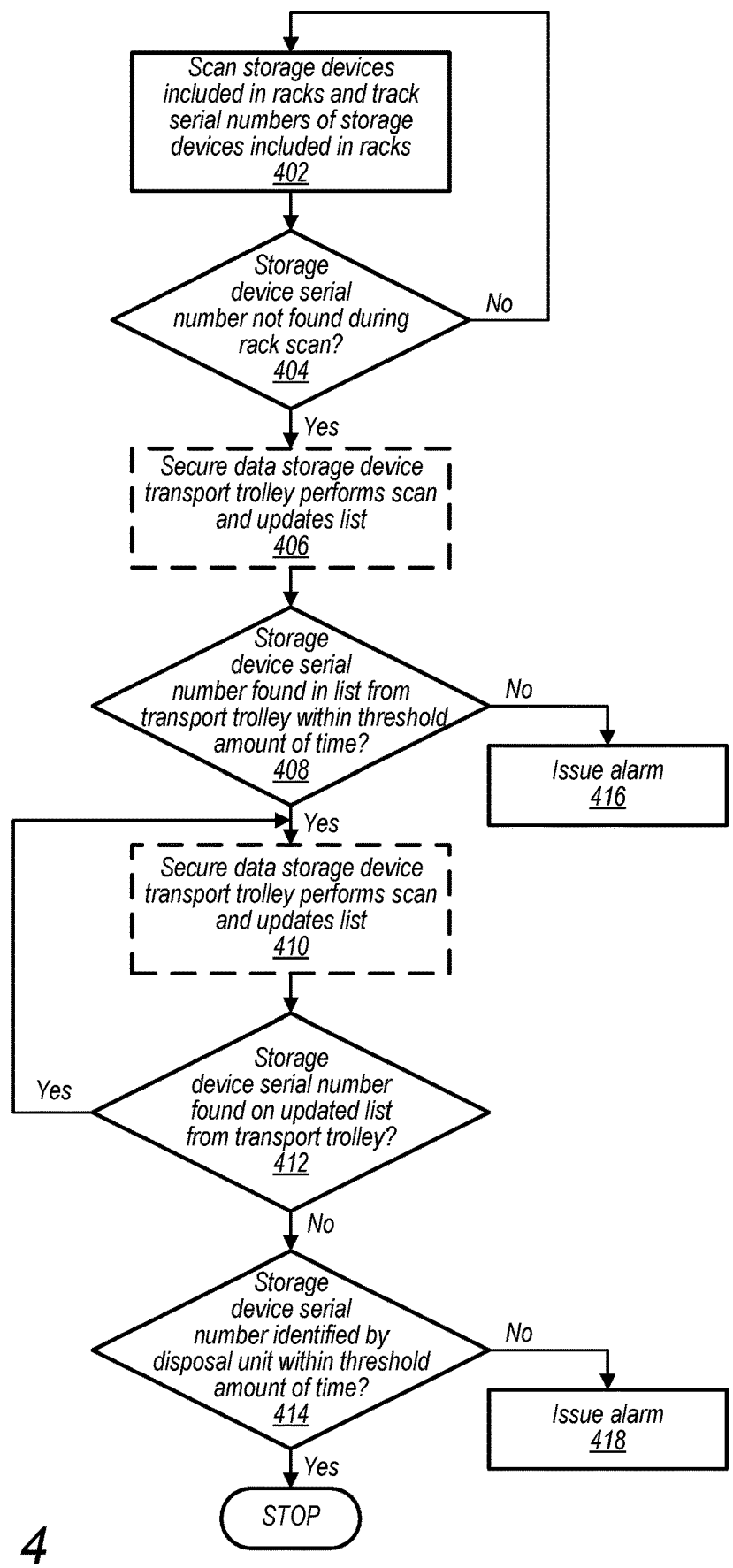
FIG. 4 is a flow diagram illustrating accounting for data storage devices being transported from a rack to a disposal unit, according to some embodiments.

FIG. 4 is a flow diagram illustrating accounting for data storage devices being transported from a rack to a disposal unit, according to some embodiments.

In some embodiments, a facility monitoring system may additionally monitor or account for data storage devices of a data center between multiple locations. For example, at 402, a monitoring system, such as facility monitoring system 114, may scan for storage devices included in racks of a the data center. The monitoring system may track the serial numbers of the data storage devices mounted in the racks in order to account for the data storage devices. For example, if a serial number of a particular data storage device is not included in a subsequent scan of data storage devices included in a rack and if there is not a record of a task being performed to remove the particular data storage device, the monitoring system may issue an alarm indicating that a data storage device is unaccounted for.

For example, at 404 a determination is made as to whether a serial number for a data storage device previously included in a rack is no longer found in the rack. If there was no task for removing the data storage device from the rack scheduled, an alarm may be activated. However, if a task was scheduled to remove the data storage device, the monitoring system may further verify that the data storage device made it into a secure data storage device transport trolley.

For example, at 406 the secure data storage device transport trolley performs a scan of data storage devices coupled to a host bus adapters/backplane of the secure data storage device transport trolley. The secure data storage device transport trolley may provide a list of data storage devices coupled to the host bus adapter/backplane of the secure data storage device transport trolley to the monitoring system.

At 408, the monitoring system may determine whether a serial number for the data storage device removed from the rack is included in a list of serial numbers of data storage devices stored in the secure data storage device transport trolley. If the serial number of the removed data storage device is not detected by the secure data storage device transport trolley within a threshold amount of time, the monitoring system may issue an alarm at 416. For example, the monitoring system may issue an alarm to a monitoring post to indicate to data center personnel that the removed data storage device is unaccounted for.

At 410 computing device/host computer of the secure data storage device transport trolley continues to perform scans of data storage devices stored in the secure data storage device transport trolley. The computing device/host computer of the secure data storage device transport trolley may provide updated lists to the monitoring system. Also, the monitoring system may verify that the serial number of the removed data storage device is accounted for by verifying that the serial number continues to be included in the list of storage devices stored in the secure data storage device transport trolley.

At 414, if the serial number of the particular removed data storage device is no longer included in the list of data storage devices stored in the secure data storage device transport trolley, the monitoring system may determine if the data storage device has been deposited in a disposal unit of the facility, such as disposal unit 112. If the removed data storage device is no longer identified as being stored in the secure data storage device transport trolley and has not been detected as being deposited in a disposal unit within a threshold amount of time, an alarm may be issued at 418.

If the removed data storage device is detected as being deposited in a disposal unit, tracking of the removed data storage device may be stopped.

Figure 5:
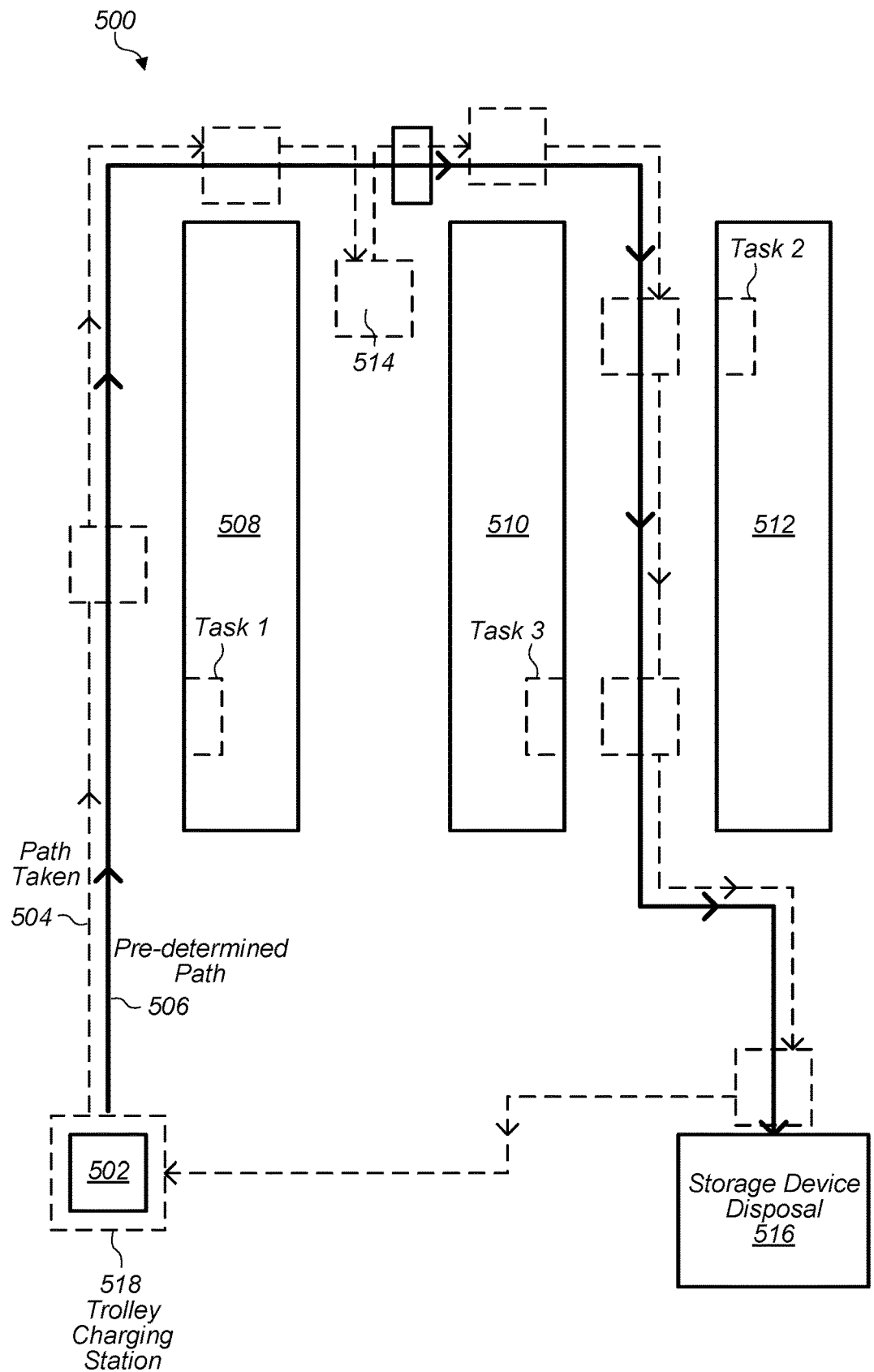
FIG. 5 is a top view of a data center space illustrating paths a secure data storage device transport trolley may follow when traversing the data center space, according to some embodiments.

FIG. 5 is a top view of a data center space illustrating paths a secure data storage device transport trolley may follow when traversing the data center space, according to some embodiments.

In some embodiments, a monitoring system and/or a secure data storage device transport trolley may track a location of the secure data storage device transport trolley in a facility, such as a data center. In some embodiments, a current location or path taken by a secure data storage device transport trolley may be compared to a predetermined path, such as the path determined at 304. In some embodiments, if a path taken by a secure data storage device transport trolley or a current location of a secure data storage device transport trolley deviates from a predetermined path by more than a threshold amount, an alarm may be activated. For example, secure data storage device transport trolley 502 in data center 500 follows path 504 that corresponds to predetermined path 506, which includes tasks 1, 2, and 3 along predetermined path 506. However, at 514 secure data storage device transport trolley 502 deviates from predetermined path 506 and enters the aisle between rows 508 and 510 instead of the aisle between rows 510 and 512 as indicated by predetermined path 506. In some embodiments, in response to a deviation from a predetermined path by more than a threshold amount, an alarm may be issued. For example an alarm may be issued at 514. In some embodiments, the alarm may be a local alarm, for example an alarm indicated by an indicator panel of a secure data storage device transport trolley. The alarm may indicate to a technician operating the secure data storage device transport trolley that the technician has deviated from the predetermined path. In some embodiments, the alarm may be a general alarm that also alerts a technician monitoring station.

In some embodiments, a secure data storage device transport trolley may be a drone, robot, or other automated device. In some embodiments, a secure data storage device transport trolley may follow a predetermined path without a technician operating or controlling the secure data storage device transport trolley. In some embodiments, a technician may walk behind an automated secure data storage device transport trolley from task location to task location.

In some embodiments, a facility, such as a data center, may include bar codes printed on a floor of the facility at certain locations, such as in front of each rack of computing devices in the facility. In some embodiments, a secure data storage device transport trolley may include a bar code scanner directed towards the floor of a facility. In such embodiments, a computing device of the secure data storage device transport trolley may track its position based on scanned bar codes, such as a bar code on a floor in front of a rack. In some embodiments, bar codes may be positioned on a floor of a facility in a grid, wherein the bar codes are used to track a location of a secure data storage device transport trolley.

In some embodiments, after depositing storage devices into a disposal unit, such as disposal unit 516, or generally after completion of a set of assigned tasks, a secure data storage device transport trolley may revert to a trolley charging station such as trolley charging station 518, wherein one or more batteries of the secure data storage device transport trolley are charged.

Figure 6:
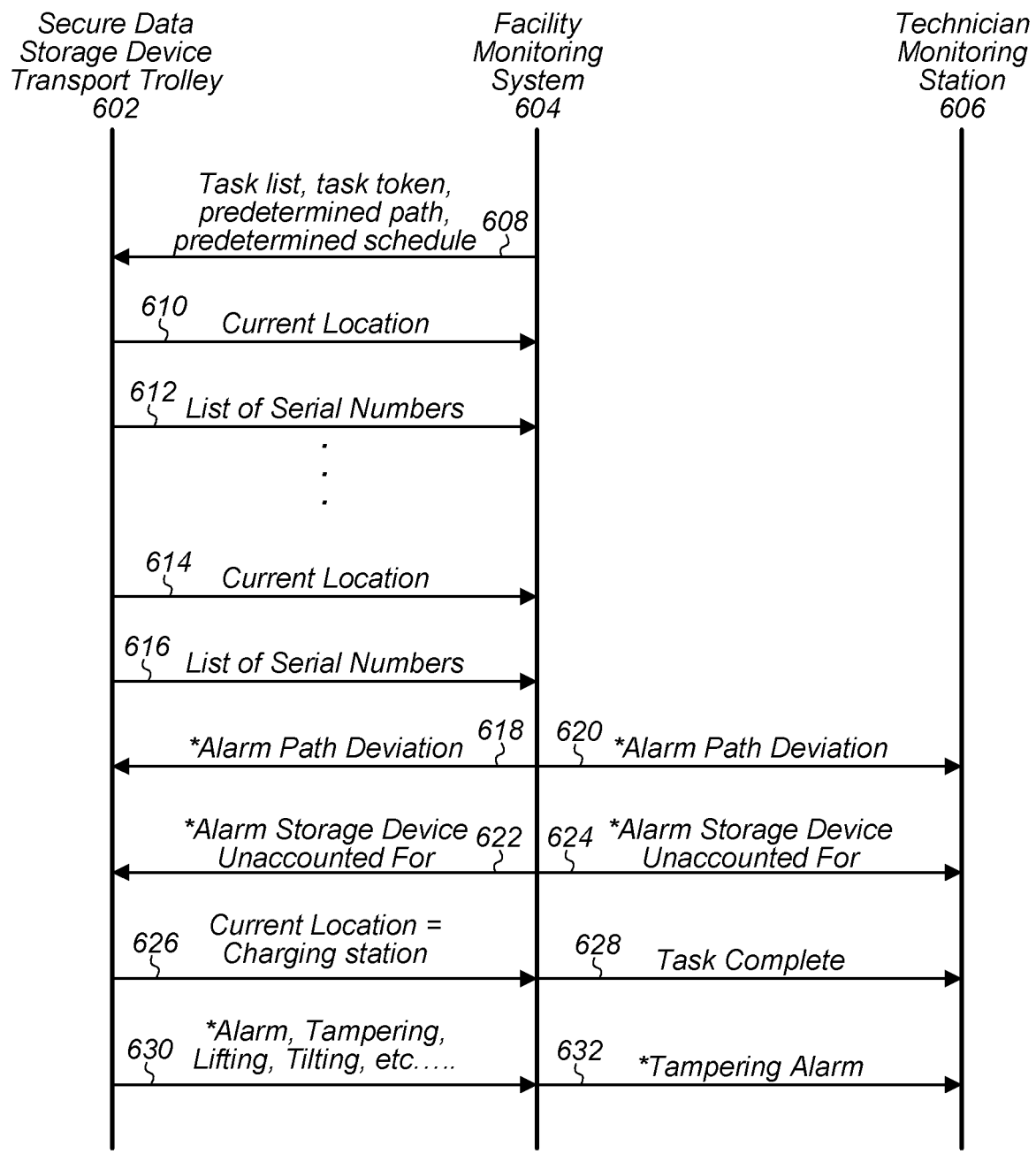
FIG. 6 illustrates example communications between a secure data storage device transport trolley, a facility monitoring system, and a technician monitoring station, according to some embodiments.

FIG. 6 illustrates example communications between a secure data storage device transport trolley, a facility monitoring system, and a technician monitoring station, according to some embodiments. The communications illustrated in FIG. 6 illustrate communications that may be sent between a secure data storage device transport trolley and a monitoring system, such as facility monitoring system 114 (facility monitoring system 604 in FIG. 6). The communications illustrated in FIG. 6 also illustrate communications that may be sent between a monitoring system, such as facility monitoring system 114 (facility monitoring system 604 in FIG. 6) and a technician monitoring station, such as would be included in a control room of a data center or other operations center (technician monitoring station 606 in FIG. 6). Note that the communications shown in FIG. 6 could be sent and received in various orders other than the order illustrated in FIG. 6. For example, any of the alarms illustrated in FIG. 6 could be sent at any time.

At 608 facility monitoring system 604 sends a task list, task tokens, a predetermined path, and/or a predetermined schedule to secure data storage device transport trolley 602. For example, the tokens may be tokens generated as described in FIG. 3. Also the predetermined path and schedule may be as described in FIG. 3. In some embodiments, task tokens may be ordered and the order of the task tokens may indicate a path to take and/or a schedule for performing the tasks. In other embodiments, each task may be included with a corresponding task token and/or a schedule may include a task token for each task listed in the schedule.

At 610 secure data storage device transport trolley 602 may send a current location of the secure data storage device transport trolley to facility monitoring system 604. The facility monitoring system may compare the current location to an expected location determined based on the predetermined path and/or the predetermined schedule. If the current location deviates from the expected location by more than a threshold amount, a facility monitoring system may issue an alarm. Also at 612, secure data storage device transport trolley 602 sends facility monitoring system 604 a list of serial numbers of data storage devices stored in secure data storage device transport trolley 602. The facility monitoring system may compare the list of serial numbers of data storage devices stored in the secure data storage device transport trolley to a list of serial numbers of data storage devices expected to be stored in the secure data storage device transport trolley per the predetermined schedule and may issue an alarm if there is a deviation. Also, in some embodiments, the facility monitoring system may compare the list of serial numbers of data storage devices stored in the secure data storage device transport trolley to a list of serial numbers for data storage devices that have been removed from racks of a data center and may issue an alarm if a removed data storage device is not identified as being stored in a secure data storage device transport trolley within a threshold amount of time since it was removed from a rack. As indicated by 614 and 616, the secure data storage device transport trolley 602 may continue to send current location updates and serial number list updates at regular intervals until all tasks are complete.

While performing the tasks and in response to certain conditions being detected, certain alarms may be issued. For example, in response to a current location of a secure data storage device transport trolley deviating from a predetermined path by more than a threshold amount, a facility monitoring system, such as facility monitoring system 604, may issue a path deviation alarm 618 to a secure data storage device transport trolley 602 and may also issue a path deviation alarm 620 to a technician monitoring station 606.

As another example, if a data storage device is unaccounted for, for example in response to any of the conditions described in FIG. 4, a facility monitoring system, such as facility monitoring system 604, may issue a storage device missing alarm 622 to a secure data storage device transport trolley 602 and issue a storage device missing alarm 624 to a technician monitoring station 606.

In some embodiments, when a secure data storage device transport trolley, such as secure data storage device transport trolley 602, is returned to a charging station, such as trolley charging station 518, the secure data storage device transport trolley may send a message 626 to a facility monitoring system, such as facility monitoring system 604, and in response, the facility monitoring system may send a message 628 to a technician monitoring station indicating that the tasks have been completed and the secure data storage device transport trolley has been returned to the charging station.

In some embodiments, a secure data storage device transport trolley, such as secure data storage device transport trolley 602, may include one or more tampering sensors, such as any of the tampering sensors described herein (door tampering, tilt, lifting, etc.). In response to detecting a tampering occurrence, secure data storage device transport trolley 602 may send message 630 to facility monitoring system 604. Also, the facility monitoring system may, in turn, send a tampering alarm 632 to technician monitoring station 606.

Note that FIG. 6 illustrates example messages that may be sent between a secure data storage device transport trolley, a facility monitoring system, and a technician monitoring station. In some embodiments more or fewer messages may be sent and the messages may be sent in various orders.

Figure 7:
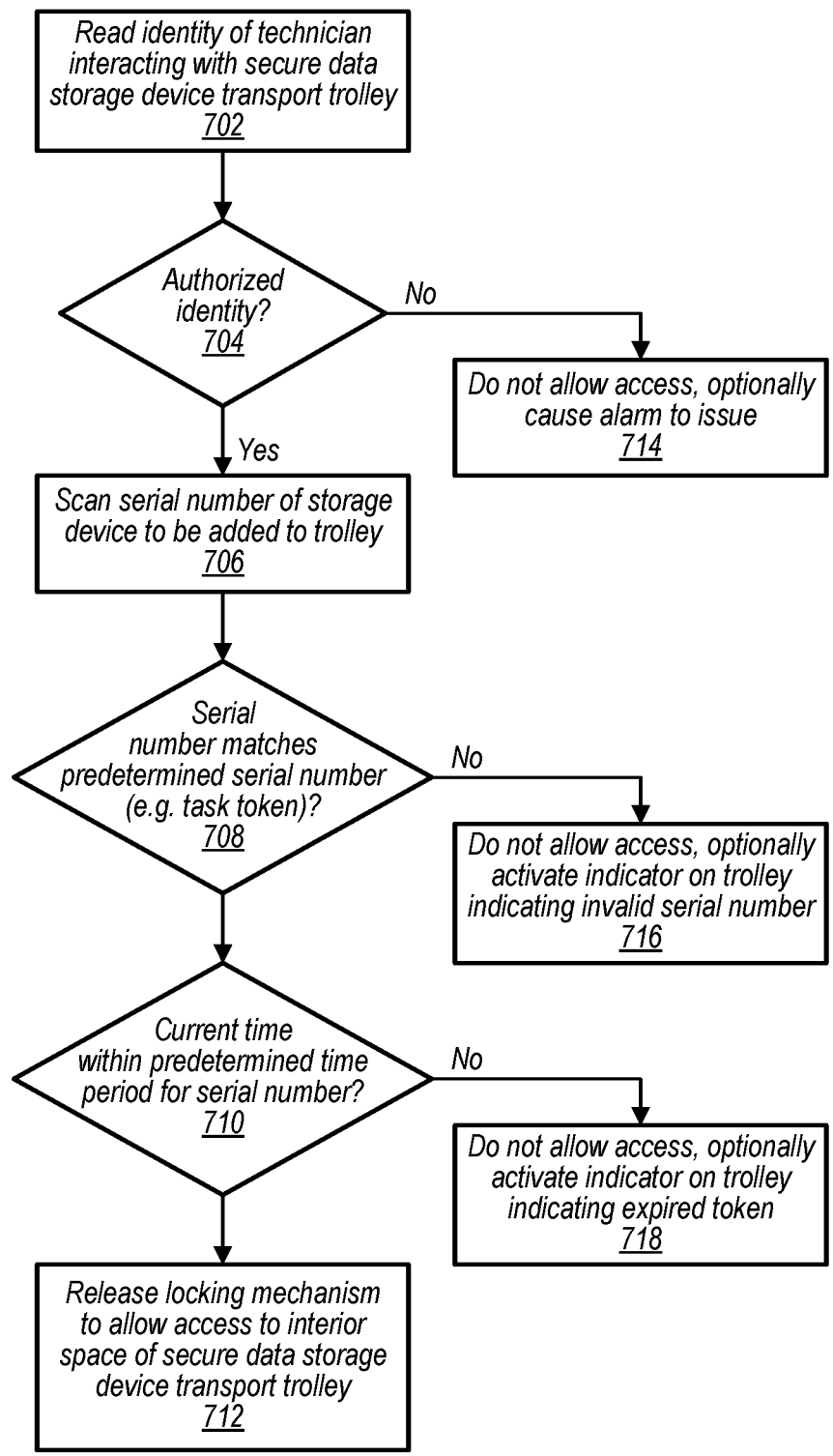
FIG. 7 is a flow diagram illustrating a process for accessing an interior space of a secure data storage device transport trolley, according to some embodiments.

FIG. 7 is a flow diagram illustrating a process for accessing an interior space of a secure data storage device transport trolley, according to some embodiments.

At 702, a secure data storage device transport trolley reads an identity of a technician interacting with the secure data storage device transport trolley. For example, the secure data storage device transport trolley may include an identity verification device such as access interface 124. In some embodiments, the identity verification device may include a proximity card reader, a fingerprint scanner, a facial recognition device, a keypad for entering a personnel ID number, or various other types of identity verification devices.

At 704, the computing device of the secure data storage device transport trolley determines whether the provided identity is an authorized identity. For example a computing device of a secure data storage device transport trolley may store a list of authorized technicians authorized to use the secure data storage device transport trolley. Also, in some embodiments, a task token may include an identity of a technician assigned to perform the task and a computing device of a secure data storage device transport trolley may verify that the assigned technician is the technician attempting to perform the task. At 714, in response to determining the provided identity is not an authorized identity, the computing device of the secure data storage device transport trolley may decline to allow access to the interior space of the secure data storage device transport trolley. In some embodiments, the computing device of the secure data storage device transport trolley may further cause an alarm to be issued indicating an attempted unauthorized access.

At 706, in response to determining that the identity of the technician attempting to perform the task is an authorized identity, the secure data storage device transport trolley accepts a scan of a serial number of a data storage device to be added to the secure data storage device transport trolley. For example, the secure data storage device transport trolley may include a bar code scanner, and the data storage device to be added to the secure data storage device transport trolley may include a bar code printed on an exterior of the data storage device. The authorized technician may scan the bar code of the data storage device to be added to the secure data storage device transport trolley to provide the serial number of the data storage device to the secure data storage device transport trolley.

At 708, the computing device of the secure data storage device transport trolley determines if the provided serial number corresponds to a serial number of a data storage device predetermined to be added to the secure data storage device transport trolley. For example, the computing device may determine that a task token stored by the computing device includes the serial number of the scanned data storage device. At 716, in response to determining that the provided serial number does not correspond to a predetermined serial number stored by the computing device of the secure data storage device transport trolley, the secure data storage device transport trolley declines to grant access to the internal space of the secure data storage device transport trolley. In some embodiments, the computing device may further cause a message to be indicated on an indicator of the secure data storage device transport trolley, wherein the message communicates to the technician that the scanned data storage device does not match any of the predetermined data storage devices to be added to the secure data storage device transport trolley.

At 710, if the provided serial number matches a predetermined serial number for a data storage device to be added to the secure data storage device transport trolley, the computing device of the secure data storage device transport trolley, may further determine if a current time is within a predetermined time period for performing the task that includes adding the removed data storage device to the secure data storage device transport trolley. For example, a task token for removing a data storage device may include a time window for when the task is to be performed. At 718, if the current time is not within the predetermined time window, e.g. the task token is expired, the computing device of the secure data storage device transport trolley may decline to grant access to the interior space of the secure data storage device transport trolley. In some embodiments, the computing device may further cause a message to be indicated on an indicator of the secure data storage device transport trolley, wherein the message communicates to the technician that a task token for the scanned data storage device has expired.

At 712, in response to verifying that the current time is within a predetermined time window for adding the removed data storage device to the secure data storage device transport trolley, the computing device may grant access to the interior space of the secure data storage device transport trolley and may cause a locking mechanism to release such that the technician can open a door to access the interior space of the secure data storage device transport trolley.

In some embodiments, more or less conditions may be required by a computing device of a secure data storage device transport trolley to gain access to an interior space of the secure data storage device transport trolley. For example, in some embodiments, a computing device may simply require that a scanned data storage device serial number match a list of serial numbers of data storage devices that are to be added to the secure data storage device transport trolley. In some embodiments, a computing device of a secure data storage device transport trolley may not require technician identity verification or may not require time window verification.

In some embodiments, a secure data storage device transport trolley may include connectors connected to a backplane or host bus adapter via ribbon cables, wherein the ribbon cables are flexible such that data storage devices having different form factors may be interchangeably added to an interior space of a secure data storage device transport trolley.

Figure 8:
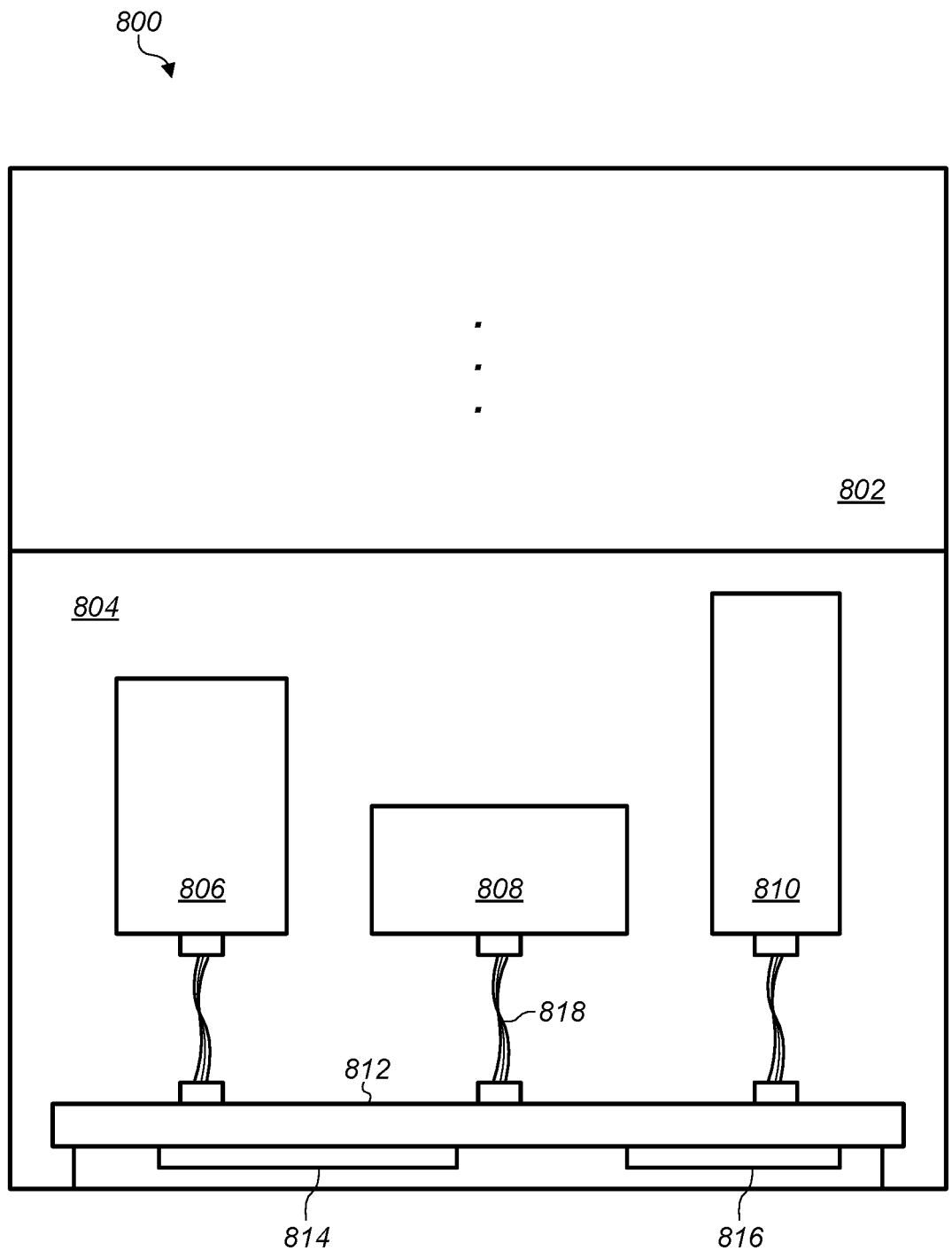
FIG. 8 illustrates an example arrangement of a secure data storage device transport trolley configured to accept data storage devices having different form factors, according to some embodiments.

For example, FIG. 8 illustrates an example arrangement of a secure data storage device transport trolley configured to accept data storage devices having different form factors, according to some embodiments. Shelf 804 of secure data storage device transport trolley 800 includes backplane 812 with computing device 814 and Wi-Fi board 816 coupled to the backplane 812. Additionally, ribbon cables 818 are coupled to backplane 812 and allow data storage devices 806, 808, and 810 each having a different form factor to be installed on shelf 804 of secure data storage device transport trolley 800. In some embodiments, a secure data storage device transport trolley, such as secure data storage device transport trolley 800, may include multiple shelves 804, such as indicated by space 802.

Figure 9:
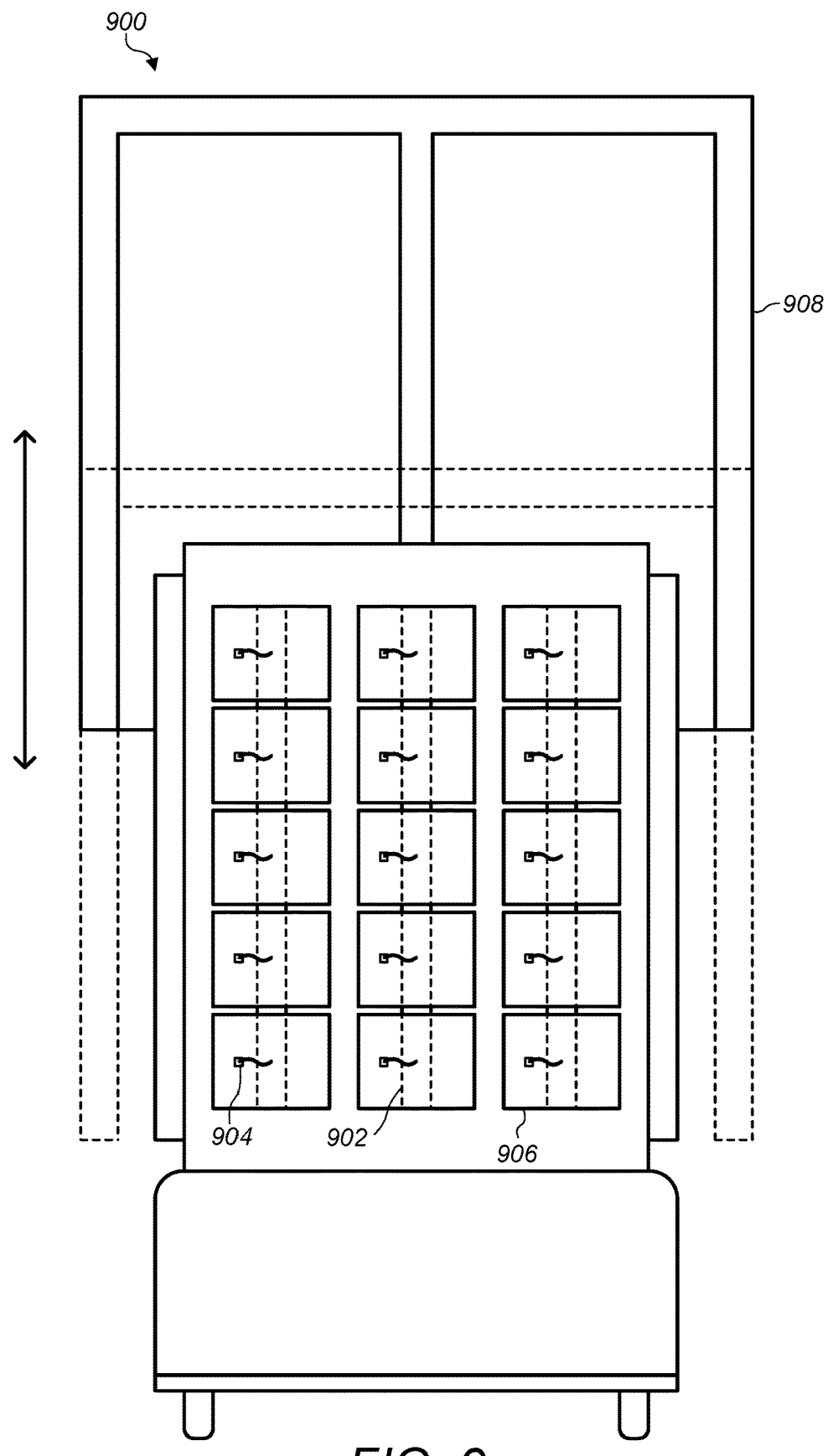
FIG. 9 illustrates an example secure data storage device transport trolley, according to some embodiments.

FIG. 9 illustrates an example secure data storage device transport trolley, according to some embodiments. Secure data storage device transport trolley 900 may be used as any of the secure data storage device transport trolley described herein. For example, in some embodiments, secure data storage device transport trolley 110 may be a secure data storage device transport trolley 900.

Secure data storage device transport trolley 900 includes backplanes 902, and connectors 904 coupled to backplanes 902. In some embodiments, a secure data storage device transport trolley, such as secure data storage device transport trolley 900, may further include cubbies 906 configured to accept and support removed data storage devices.

In some embodiments, secure data storage device transport trolley 900 may also include door 908. In some embodiments, door 908 may be hydraulically or mechanically operated to lift up to permit access to an interior space of secure data storage device transport trolley 900, e.g. cubbies 906, and may lower down to prevent access to the interior space of secure data storage device transport trolley 900, e.g. cubbies 906.

In some embodiments, secure data storage device transport trolley 900 may include automated locomotive elements, such as wheels, a track, a hover platform, or other locomotive element. In some embodiments, a secure data storage device transport trolley 900 may be self-driving. For example, an onboard computer system of a secure data storage device transport trolley 900 may cause the secure data storage device transport trolley 900 to navigate a data center according to a predetermined path without a technician guiding the secure data storage device transport trolley 900.

Figure 10A:
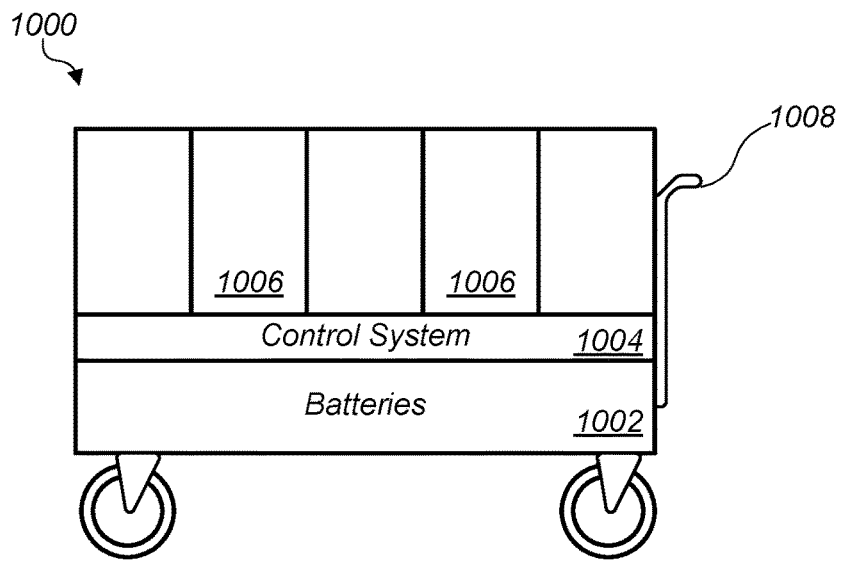
FIG. 10A illustrates another example secure data storage device transport trolley, according to some embodiments.

FIG. 10A illustrates another example secure data storage device transport trolley, according to some embodiments.

Trolley 1000 includes batteries 1002, control system 1004, and modular media storage containers 1006. In some embodiments, different ones of the modular media storage containers, such as different ones of modular media storage containers 1006, are respectively configured to accept hard disk drives, solid state drives, or non-volatile memory devices. In some embodiments, modular media storage containers, such as modular media storage containers 1006, couple with a primary communication bus of a control system, such as control system 1004. In some embodiments, modular media storage containers, such as different ones of modular media storage containers 1006, are removable and interchangeable, such that different configurations of modular media storage containers may be coupled to a trolley, such as trolley 1000, depending on which types of data storage devices are to be transported in trolley 1000. For example, if more hard disk drives are to be transported in a trolley than solid state drives, a modular media storage container configured to accept sold state drives may be de-coupled from a trolley and a modular media storage container configured to accept hard disk drives may be coupled to the trolley. In this way, a combination of types of modular media storage containers may be configured to meet a current demand for a trolley. In some embodiments, a primary communication bus of a control system for a trolley, such as control system 1004, may communicate in accordance with a serial ATA (SATA) standard, a serial attached SCSI (SAS) standard, or PCIe standard. In some embodiments, a primary communication bus of a control system for a trolley, such as control system 1004, may communicate in accordance with other suitable communication standards used by data storage devices. In some embodiments, respective ones of a plurality of modular media storage containers may be configured to convert a signal from an attached data storage device to a signal formatted in accordance with a standard used by a control system, such as control system 1004. For example, in some embodiments a control system and a primary communication bus may be configured to communicate according to a PCIe standard, and respective ones of the modular media device containers may convert PCIe signals into SATA, SCI, NVMe, etc. signals such that the attached data storage devices are in communication with a control system of the trolley, such as control system 1004. In some embodiments, a trolley, such as trolley 1000, may support transporting and tracking attached data storage devices, including 2.5" or 3.5" solid state drives with SATA connectors, 3.5" hard disk drives with SATA connectors, 3.5" hard disk drives with SAS connectors, half-width or full-width PCIe cards, e.g. NVMe SSD (PCIe slot) cards, 2.5" or 3.5" single or double height solid state drives with cabled PCIe connectors, e.g. NVME SSD (cabled PCIe) drives, or various other types of data storage devices.

Additionally, in some embodiments, a trolley, such as trolley 1000, may include a handle connected to an automatic breaking system, such as handle 1008. The handle may release a breaking system of the trolley when the handle is pulled down and may engage a breaking system when the handle is not pulled down, e.g. when the handle is released.

Figure 10B:
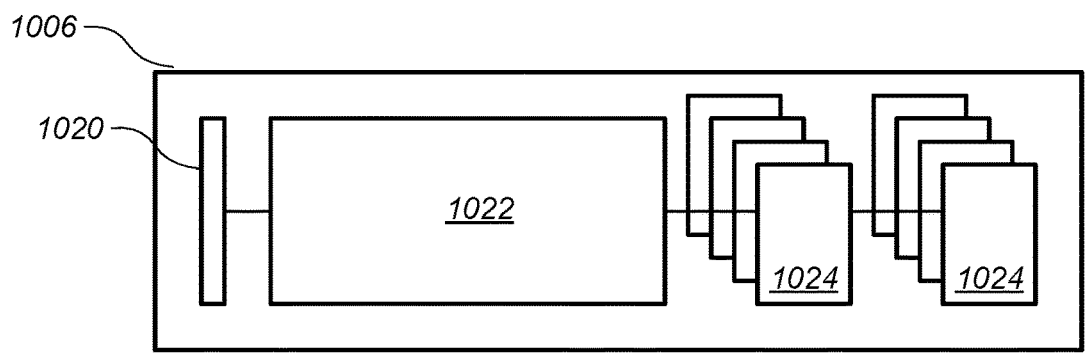
FIG. 10B illustrates a modular media device container, according to some embodiments.

FIG. 10B illustrates a modular media device container, according to some embodiments. Modular media storage container 1006 illustrated in FIG. 10B includes host bus adapter/backplane 1022 that connects to a primary communication bus a control system, such as control system 1004, via a connector, such as connector 1020. Also modular media storage container 1006 includes multiple connectors 1024 configured to couple with data storage devices placed in modular media storage container 1006.

In some embodiments, each modular media storage container of a trolley, such as modular media storage containers 1006 of trolley 1000, may include separate doors that are separate from one another. Also, in some embodiments, a trolley may not include a door, or may not include doors for modular media storage containers.

In some embodiments, a switch or other type of proximity device may be used to ensure a data storage device is coupled in a designated location in the trolley.

Figure 10C:
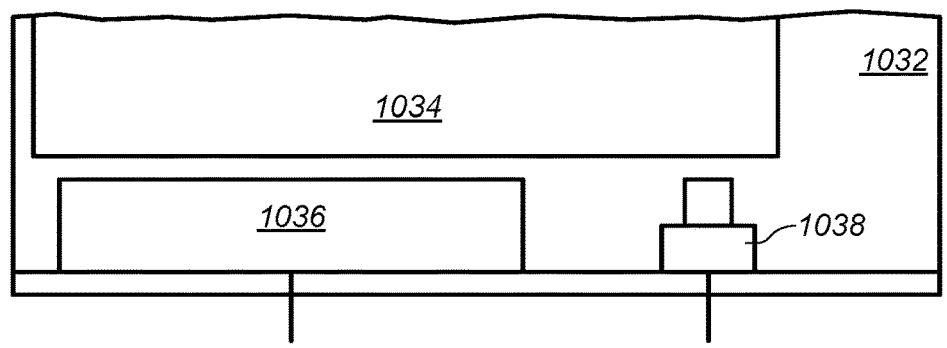
FIG. 10C illustrates a modular media device container that includes presence switches, according to some embodiments.

FIG. 10C illustrates a modular media storage container that includes presence switches, according to some embodiments. Compartment 1032 includes connector 1036 coupled to data storage device 1034 and presence switch 1038 that is depressed when data storage device 1034 is coupled to connector 1036. In some embodiments, a control system, such as control system 1004, may monitor "presence" of data storage devices in a trolley, such as trolley 1000, via presence indicating devices, such as presence switch 1038.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

What is claimed is:

1. A data center comprising:
racks comprising storage devices; and
a secure storage device transporter, comprising:
a locomotive element configured to facilitate movement of the secure storage device transporter within the data center;
a host bus adapter;
a host computing device coupled to the host bus adapter; and
a plurality of connectors, wherein respective ones of the connectors are configured to couple with respective storage devices removed from the one or more racks such that the respective storage devices are coupled to the host bus adapter via the respective ones of the connectors,
wherein the host computing device is configured to:
identify respective serial numbers of the respective storage devices coupled to the host bus adapter; and
maintain a list comprising one or more serial numbers for each of one or more storage devices coupled to the host bus adapter.

2. The data center of claim 1, wherein the secure storage device transporter further comprises:
an interior space at least partially enclosed by a structure of the secure storage device transporter, wherein the plurality of connectors are positioned such that the respective ones of the storage devices, when coupled to the plurality of connectors, are positioned in the interior space;
a door configured to prevent access to the interior space when closed and configured allow access to the interior space when open; and
a locking mechanism,
wherein the host computing device is configured to:
cause the locking mechanism to release in response to verifying a serial number of a storage device to be added to the secure storage device transporter matches a serial number of a storage device scheduled to be added to the secure storage device transporter, and
refrain from releasing the locking mechanism in response to a serial number of a storage device to be added to the secure storage device transporter failing to match a serial number of a storage device scheduled to be added to the secure storage device transporter.

3. The data center of claim 1, further comprising:
a storage device disposal unit; and
a storage device monitoring system,
wherein the host computing device of the secure storage device transporter is configured to provide the list comprising the one or more serial numbers to the storage device monitoring system, and
wherein the storage device monitoring system is configured to issue an alarm in response to a serial number of a particular storage device not being identified by the storage device disposal unit within a threshold amount of time after the serial number of the particular storage device is left off the list provided by the host computing device.

4. The data center of claim 3, wherein, the storage device monitoring system is further configured to:
receive location information about a location of the secure storage device transporter within the data center; and
issue an alarm in response to the secure storage device transporter deviating from a predetermined path.

5. An apparatus comprising:
a mobile structure for transporting data storage devices within a facility;
a backplane coupled to the mobile structure;
a computing device connected to the backplane; and
a plurality of connectors coupled to the backplane, wherein respective ones of the connectors are configured to couple with respective data storage devices being transported in the mobile structure,
wherein the computing device is configured to:
scan the plurality of connectors to identify identifiers of data storage devices currently coupled to the backplane via the connectors; and
update a list comprising one or more identifiers for one or more data storage devices currently coupled to the backplane.

6. The apparatus of claim 5, further comprising:
an interior space at least partially enclosed by the mobile structure, wherein the plurality of connectors are positioned such that data storage devices, when coupled to the plurality of connectors, are positioned in the interior space;
a door configured to prevent access to the interior space; and
a locking mechanism,
wherein the computing device is configured to:
cause the locking mechanism to release in response to verifying an identifier of a data storage device matches a pre-determined identifier; and
refrain from releasing the locking mechanism in response to an identifier of a data storage device not matching the pre-determined identifier.

7. The apparatus of claim 6, further comprising:
a scanner device,
wherein the computing device is further configured to receive an identifier of a data storage device from the scanner device.

8. The apparatus of claim 6, further comprising:
an identity verification device configured to verify an identity of an individual attempting to add a data storage device to the interior space,
wherein the computing device is further configured to:
cause the locking mechanism to release in response to verifying the identity matches an identity authorized to access the interior space; and
refrain from releasing the locking mechanism in response to the identity not matching an identity authorized to access the interior space.

9. The apparatus of claim 6, further comprising:
a wireless communication interface configured to send or receive wireless communications between the computing device and a facility monitoring system.

10. The apparatus of claim 9, wherein the computing device is further configured to:
receive, from the facility monitoring system, pre-determined identifiers of storage devices to be added to the interior space within a predetermined time period; and cause, during the predetermined time period, the locking mechanism to release in response to verifying an identifier of a data storage device matches one of the pre-determined identifiers; and refrain from releasing the locking mechanism in response to an identifier of a data storage device not matching the pre-determined identifier or in response to a current time being outside of the predetermined time period.

11. The apparatus of claim 10, further comprising:
an indicator element configured to provide an indication to a user of the apparatus that the data storage device does not have an identifier matching one of the pre-determined identifiers.

12. The apparatus of claim 9, wherein the computing device is further configured to:
provide, via a wireless connection, updated versions of the list to the facility monitoring system.

13. The apparatus of claim 5, wherein the computing device is further configured to:
perform diagnostic testing of a data storage device.

14. The apparatus of claim 5, further comprising:
a self-propulsion system; and
a self-navigation system.

15. The apparatus of claim 5, further comprising:
a plurality of ribbon cables, wherein the plurality of connectors are coupled to the backplane via respective ones of the ribbon cables.

16. A method comprising:
maintaining, by a computing device of a secure storage device transporter, a list comprising one or more identifiers for one or more storage devices coupled to a backplane of the secure storage device transporter via one or more connectors of the secure storage device transporter;
scanning at a pre-determined time interval, a plurality of connectors of the secure storage device transporter to identify identifiers of storage devices currently coupled to the backplane of the secure storage device transporter via one or more connectors of the secure storage device transporter; and
updating the list to include identifiers of storage devices that have been coupled to the backplane and to not include identifiers for storage devices that have been decoupled from the backplane.

17. The method of claim 16, further comprising:
providing, via a wireless connection, the updated list to a facility monitoring system.

18. The method of claim 16, further comprising:
triggering an alarm in response to detecting:
tampering with a door of the secure storage device transporter;
tilting of the secure storage device transporter more than a threshold amount; or
lifting of the secure storage device transporter more than a threshold amount.

19. The method of claim 16, further comprising:
scanning at a different pre-determined time interval, when a door of the secure storage device transporter is open, the plurality of connectors of the secure storage device transporter to identify identifiers of storage devices currently coupled to the backplane of the secure storage device transporter via one or more connectors of the secure storage device transporter.

20. The method of claim 16, further comprising;
tracking a location of the secure storage device transporter in a facility as the secure storage device transporter is moved within the facility; and
issuing an alarm in response to the location of the secure storage device transporter deviating from a pre-determined path by more than a threshold amount.

* * * * *